United States Patent
Dujodwala et al.

(10) Patent No.: US 10,374,900 B2
(45) Date of Patent: Aug. 6, 2019

(54) UPDATING A VIRTUAL NETWORK TOPOLOGY BASED ON MONITORED APPLICATION DATA

(71) Applicant: HEWLETT PACKARD ENTERPRISE DEVELOPMENT LP, Houston, TX (US)

(72) Inventors: Yogesh Dujodwala, Bangalore (IN); Sunil Gurumallesha, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 288 days.

(21) Appl. No.: 15/500,039

(22) PCT Filed: Mar. 16, 2015

(86) PCT No.: PCT/US2015/020645
§ 371 (c)(1),
(2) Date: Jan. 28, 2017

(87) PCT Pub. No.: WO2016/089435
PCT Pub. Date: Jun. 9, 2016

(65) Prior Publication Data
US 2017/0244607 A1    Aug. 24, 2017

(30) Foreign Application Priority Data
Dec. 3, 2014    (IN) ............................ 6093/CHE/2014

(51) Int. Cl.
*H04L 12/24* (2006.01)
*H04L 12/42* (2006.01)
(Continued)

(52) U.S. Cl.
CPC .......... *H04L 41/0896* (2013.01); *H04L 12/42* (2013.01); *H04L 41/0213* (2013.01);
(Continued)

(58) Field of Classification Search
CPC . H04L 41/0213; H04L 41/0896; H04L 41/12; H04L 41/147; H04L 41/5096;
(Continued)

(56) References Cited

U.S. PATENT DOCUMENTS

2009/0059793 A1 *   3/2009   Greenberg .......... H04L 41/0803
                                                370/235
2009/0245137 A1    10/2009   Hares et al.
(Continued)

OTHER PUBLICATIONS

International Searching Authority, "Notification of Transmittal of the International Search Report and the Written Opinion" PCT/US2015/020645, dated Aug. 21, 2015. 12 pages.
(Continued)

*Primary Examiner* — Jungwon Chang
(74) *Attorney, Agent, or Firm* — Brooks, Cameron & Huebsch, PLLC (57) ABSTRACT

In some examples, data traffic over a virtual network can be monitored for an application. An existing topology for the virtual network can be updated based on the monitored data. The updated topology can, for example, be determined to better handle predicted data traffic for the application. The topology of the virtual network can then be updated to achieve the determined updated virtual network topology.

14 Claims, 4 Drawing Sheets

(51) Int. Cl.
*H04L 29/08* (2006.01)
*H04L 12/26* (2006.01)
*H04L 12/815* (2013.01)
*H04L 12/801* (2013.01)

(52) U.S. Cl.
CPC ............ *H04L 41/12* (2013.01); *H04L 41/147* (2013.01); *H04L 41/5025* (2013.01); *H04L 41/5096* (2013.01); *H04L 43/08* (2013.01); *H04L 43/0882* (2013.01); *H04L 43/16* (2013.01); *H04L 47/10* (2013.01); *H04L 47/12* (2013.01); *H04L 47/22* (2013.01); *H04L 67/22* (2013.01)

(58) Field of Classification Search
CPC ... H04L 41/0803; H04L 45/245; H04L 43/08; H04L 67/1012; H04L 41/5025; H04L 67/22; H04L 43/16; H04L 43/0882; H04L 12/42; H04L 47/12; H04L 47/22; H04L 47/10
USPC .................. 709/226, 238, 224; 370/252, 235
See application file for complete search history.

(56) References Cited

U.S. PATENT DOCUMENTS

| | | | |
|---|---|---|---|
| 2010/0220622 A1* | 9/2010 | Wei | H04L 41/0896 370/252 |
| 2012/0110206 A1* | 5/2012 | Bhatt | H04L 45/245 709/238 |
| 2013/0073706 A1 | 3/2013 | Iijima et al. | |
| 2013/0086273 A1* | 4/2013 | Wray | G06F 9/5072 709/226 |
| 2013/0219497 A1 | 8/2013 | Lukas et al. | |
| 2013/0227116 A1 | 8/2013 | Radhakrishnan et al. | |
| 2013/0254384 A1* | 9/2013 | Wray | H04L 43/08 709/224 |
| 2013/0346899 A1 | 12/2013 | Cole et al. | |
| 2015/0358391 A1* | 12/2015 | Moon | H04L 67/10 709/224 |
| 2016/0094641 A1* | 3/2016 | Rahman | H04L 67/1012 718/1 |

OTHER PUBLICATIONS

Koehler. M., "An Adaptive Framework for Utility-Based Optimization of Scientific Applications in the Cloud", Journal of Cloud Computing, a SpringerOpen Journal, May 12, 2014 8 pages.

* cited by examiner

UPDATING A VIRTUAL NETWORK TOPOLOGY BASED ON MONITORED APPLICATION DATA

BACKGROUND

Computer networks can be used to allow networked devices, such as personal computers, servers, data storage devices, etc., to communicate and share resources. Network virtualization is often used in application development and testing to mimic hardware and software of a network. Indeed, many aspects of network hardware, such as network interface cards (NICs), network switches, host devices, cabling, etc., can be virtualized. Network virtualization can also be used to combine or subdivide one or more hardware-based networks into one or more virtual networks in order to improve efficiency, reliability, manageability, scalability, or other aspects of the network.

DETAILED DESCRIPTION

As provided above, computer networks can be used to allow networked devices to communicate and share resources. Some computer networks are designed to host and manage software applications that are available to remote users with access to the network. For example, under the Software-as-a-Service (SaaS) model, a user can be provided access to software applications and databases hosted on the network and maintained by the provider of the service. For example, the service provider can install and operate software applications in the network as well as manage the infrastructure and platforms that run the applications. A user can, for example, use the software via a client device connected to the network (e.g., via a web browser or a dedicated client application). Such network-hosted applications can, for example, be implemented to simplify maintenance, support, scalability, and security.

Network virtualization can further be used to improve operation of the network-hosted applications. As but one example, application tasks can be cloned onto multiple virtual machines at run-time to meet changing work demand and load balancers can be used to distribute work over the set of virtual machines. As described further in the following disclosure, it is further possible to scale the infrastructure of a virtual network (e.g., by adding or removing data routing devices and/or data paths between devices) to better accommodate a load from the application.

Although network-hosted applications provide numerous advantages, it is also important to meet any defined quality of service (QoS) metrics for use of the application. For example, some applications (e.g., certain streaming video applications) may require high reliability on data transfer and low packet loss. Indeed, many service providers are contractually obligated to ensure a certain QoS via a Service Level Agreement (SLA) or other agreement with the user. However, unlike locally hosted applications, network-hosted applications are often designed to communicate with devices located on different networks (e.g., via cloud computing over the internet) and are passed through numerous intermediary routing devices between the client and server. As such, the QoS for such network-hosted applications can be significantly more variable than locally hosted applications.

The present disclosure is directed to solutions for improving the above technologies. For example, in some implementations, a system is designed to configure a virtual network infrastructure hosting a software application in order to intelligently route traffic over the network based on historical trends of the application. This process can involve creating and/or updating the existing network topology based on the historical data available for the application. Using this information, the network can make better use of its resources and can, for example, achieve a better return on investment. With continued use of the network, performance parameters can continue to improve. Other advantages of the solutions presented herein will be apparent upon review of the description and figures.

The following description is broken into sections. The first, labeled "Environment," describes an example of a network environment in which various embodiments may be implemented. The second, labeled "Components," describes examples of physical and logical components for implementing various embodiments. The third section, labeled "Operation," describes steps taken to implement various embodiments.

Figure 1:
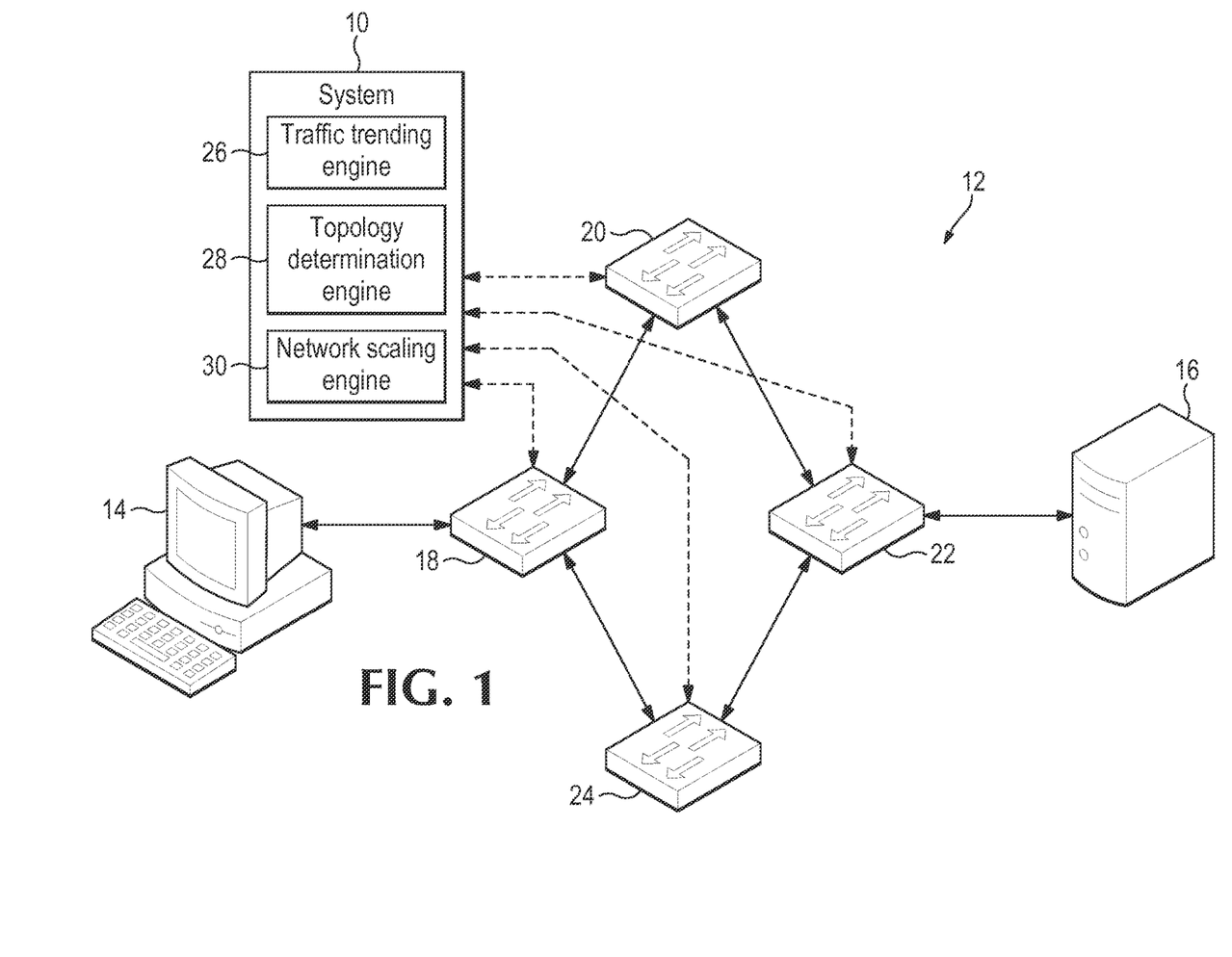
FIG. 1 depicts a system interfaced with an example network having an initial topology, according to an example.
Figure 2:
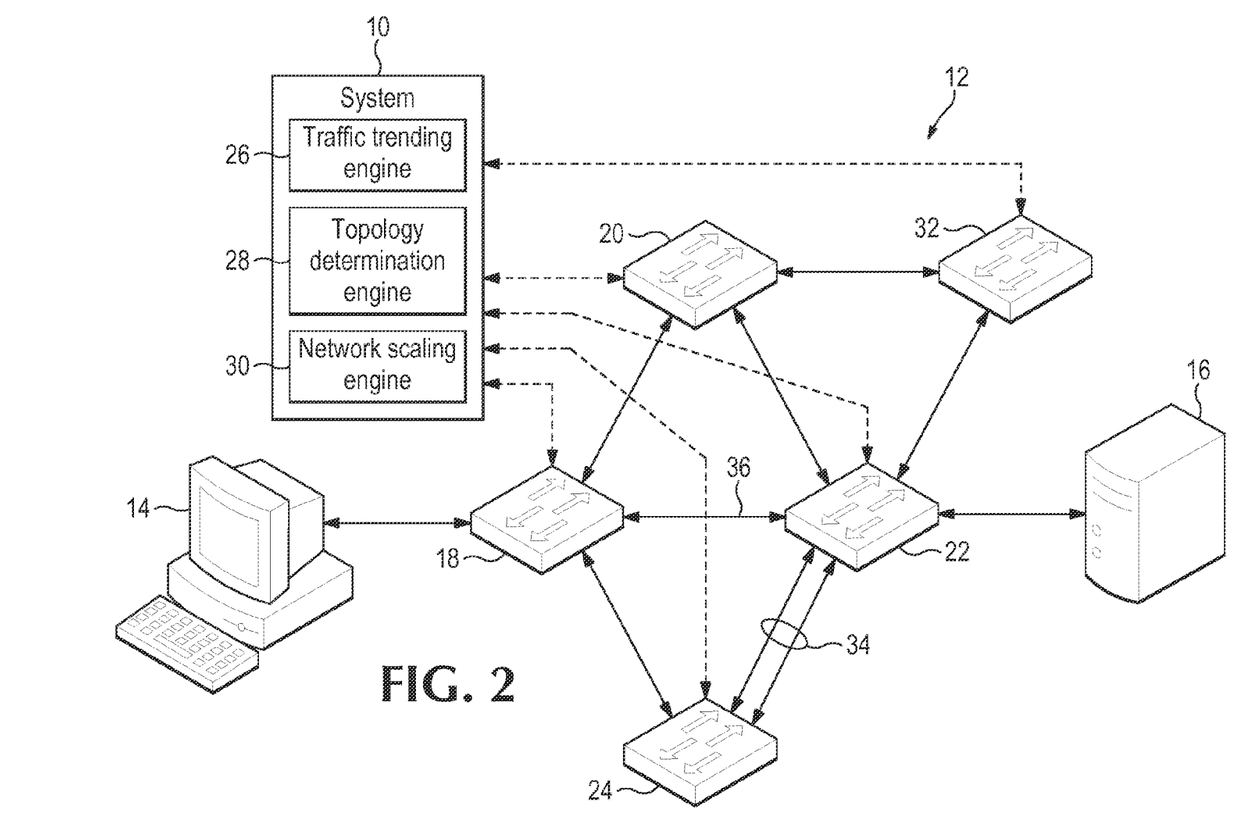
FIG. 2 depicts the system of FIG. 1 interfaced with an example network having an updated topology, according to an example.

ENVIRONMENT: FIGS. 1 and 2 illustrate an example system 10 and virtual network 12 according to the present disclosure. As described in further detail herein, system 10 can, for example, be interfaced with virtual network 12 and use historical data trends of a network-hosted application in order to improve performance of the application over network 12. In particular, FIG. 1 illustrates virtual network 12, which has an initial network topology, before being updated by system 10, and FIG. 2 illustrates virtual network 12, which has an updated network topology, after being updated by system 10.

The term "virtual network" as used herein can, for example, refer to a computer network that includes, at least in part, virtual network links and virtual devices implemented using methods of network virtualization. As but one example, a virtual switch can be implemented to a virtual network, which can allow virtual machines to communicate using the same protocols as physical switches. The virtual switch can, for example, emulate a traditional physical Ethernet network switch by forwarding frames at the data-link layers. Similarly, virtual routers can be implemented that are designed to route packets from one network to another based on decisions taken from routing tables. The functionality of such a virtual router may be similar to that of a physical router but packets can be sent between virtual machines in different networks. Virtual machines can, for example, have virtual Ethernet cards, which can be treated similarly to a physical (i.e., non-virtual) Network Interface Card (NIC) for use in a physical (i.e., non-virtual) network.

Virtualization can, for example, be used to combine hardware and software network resources and network functionality into a single, software-based administrative entity. For example, just like non-virtual devices in a non-virtual network, various virtual devices in a virtual network can define the network connectivity for applications hosted in the network. For example, a virtual network link between a first and second hardware component of the network may not include a direct physical connection (either wired or wireless) between the two components but may be treated as a direct connection for purposes of administration.

Virtual network 12 can, for example, be overlaid or otherwise integrated into a cloud network, with the virtualized routing infrastructure and the application being hosted in the cloud network. The term "cloud network" as used herein can, for example, refer to computer networks in which large groups of remote servers are networked to allow centralized data storage and online access to computer services or resources.

The term "topology" as used herein can, for example, refer to the arrangement of the various infrastructure elements (links, nodes, etc.) of a virtual network (e.g., virtual network 12). The topology of virtual network 12 can refer to the logical topology of the network and can, for example, indicate how data flows within the virtual network rather than any sort of physical relationship between the virtual links, nodes, etc.

In the diagram of FIG. 1, a client 14 is connected to a server 16 through a topology that includes virtual network nodes 18, 20, 22, and 24. It is appreciated that the solutions described herein can be used or adapted for networks including more or fewer devices, different types of devices, and different network arrangements. According to this example, traffic between client 14 and server 16 can flow via a first data routing path that includes virtual network nodes 18, 20, and 22, and can flow via a second data routing path that includes virtual network nodes 18, 24, and 22. These paths can, for example, be selected by a network controller, administrator, or another entity, and can, for example, be based on network conditions, network equipment capabilities, or other factors.

Client 14 and server 16 can, for example, be in the form of network hosts or other suitable types of network nodes. For example, client 14 and server 16 can be in the form of suitable servers, desktop computers, laptops, printers, etc. As but one example, client 14 can be in the form of a desktop computer including a monitor for presenting information to an operator and a keyboard and mouse for receiving input from an operator, and server 16 can be in the form of a standalone storage server appliance. In some implementations, client 14 and server 16 can nodes in a VM running on a server. It is appreciated that client 14 and server 16 can be endpoint nodes on virtual network 12, intermediate nodes between endpoint nodes, or other types of network nodes. It is further appreciated that the use of "client" and "server" is for convenience regarding aspects of the network nodes and is not intended to limit client 14 to only client-related functionality or to limit server 16 to only server-related functionality. Indeed, in some circumstances (e.g., at certain times), client 14 may function as a server to server 16 and server 16 may function as a client to client 14.

Virtual nodes 18, 20, 22, and 24 can, for example, be in the form of virtual switches or other multi-port network bridges to process and forward data at the data link layer. In some implementations, one or more of the virtual nodes can be in the form of virtual multilayer switches that operate at multiple layers of the OSI model (e.g., the data link and network layers). Although the term "switch" is used throughout this description, it is appreciated that this term can refer broadly to other suitable network data forwarding devices. For example, a virtualized general purpose computer can include suitable hardware and machine-readable instructions that allow the computer to function as a virtual switch. It is appreciated that the term "switch" can include other network data path elements in the form of suitable routers, gateways and other devices that provide switch-like functionality for virtual network 12.

Flow paths can be installed on virtual nodes 18, 20, 22, and 24 to flow traffic along a selected virtual routing path defined by the nodes. The nodes can, for example, be designed to forward traffic along a datapath based on metadata within the traffic. For example, traffic received at a node can be in the form of a packet that includes route-related metadata. The term "packet" is used herein for convenience, however, it is appreciated that the term "packet" is intended to refer to any suitable protocol data unit (PDU). Such a packet can, for example, include payload data as well as metadata in the form of control data. Control data can, for example, include data to assist the node with reliably delivering the payload data. For example, control data can include network addresses for client 14 and server 16, error detection codes, sequencing information, and packet size of the packet. In contrast, payload data can include data carried on behalf of an application for use by client 14 and server 16.

Each node within virtual network 12 can, for example, be designed to help manage the flow of data across the network by only transmitting a received message to a destination node for which the message was intended (or to an intermediary device en route to the destination device). In some implementations, the virtual nodes can rely on flow entries in flow tables stored on a machine-readable medium within each switch (or otherwise accessible by each switch). Each flow entry in a flow table can, for example, contain information such as: (1) match fields to match against packets (e.g., an ingress port and specific packet header fields), (2) a priority value for the flow entry to allow prioritization over other flow entries, (3) counters that are updated when packets are matched, (4) instructions to modify the action set or pipeline processing, and (5) timeouts indicating a maximum amount of time or idle time before a flow is expired, and (6) a cookie value which can be used to filter flow statistics, flow modification, and flow deletion.

COMPONENTS: In this implementation, system 10 includes: (1) a traffic trending engine 26 to determine historical data trends for application data traffic monitored over a virtualized routing infrastructure in the network, (2) a topology determination engine 28 to determine an updated virtual network topology for the virtualized routing infrastructure based on the historical data trends, (3) and a network scaling engine 30 to automatically scale the virtualized routing infrastructure to achieve the updated virtual network topology. Each engine of system 10 is described in further detail below.

System 10 is connected to the various nodes of virtual network 12 via various virtualized wired or wireless data links. For illustration, FIGS. 1 and 2 depicts system 10 as being connected to virtual nodes via broken lines, which are intended to represent control channels rather than actual physical (or virtual) data links. It is appreciated that system 10 may be directly connected to only one or a few virtual nodes, while being indirectly connected to other virtual nodes of virtual network 12. As but one example, system 10 can be directly connected to virtual node 18 via a direct virtual link, while being indirectly connected to virtual node 20 (e.g., by relying on virtual node 18 as an intermediary for communication with virtual node 20).

System 10 is described in further detail below using functional engines. Such functional engines can, for example, be operative to execute one or more steps of methods or other operations described herein. As used herein, the term "engine" refers to a combination of hardware (e.g., a processing resource such as an integrated circuit or other circuitry) and software (e.g., machine- or processing resource-executable instructions, commands, or code such as firmware, programming, or object code). A combination of hardware and software can include hardware only (i.e., a hardware element with no software elements), software hosted at hardware (e.g., software that is stored at a memory resource and executed or interpreted at a processing resource), or at hardware and software hosted at hardware. Additionally, as used herein, the singular forms "a," "an," and "the" include plural referents unless the context clearly dictates otherwise. Thus, for example, the term "engine" is intended to mean one or more engines or a combination of engines. Each engine of system 10 can include one or more machine-readable storage mediums and one or more computer processing resources. As but one example, software that provides the functionality of engines on system 10 can be stored on a memory resource of a computer to be executed by a processing resource of the computer.

The functionality of system 10 can, for example, be implemented in part using a software program on a stand-alone machine, such as a server. In some implementations, system 10 can be implemented on multi-purpose machines, such as a suitable desktop computer, laptop, tablet, or the like. In some implementations, system 10 can be implemented on a suitable non-host network node, such as certain types of network switches. It is appreciated that the functionality of system 10 may be split among multiple machines. For example, virtual network 12 is described and illustrated as including only one system 10. However, it is appreciated that the disclosure herein can be implemented in networks with multiple systems working together. For example, in some networks, network devices are in communication with redundant systems 10 such that management of the network can be smoothly handed over from a first system 10 to a second system 10 if first system 10 fails or is otherwise out of operation. As another example, multiple systems can work together to concurrently manage virtual network 12. In such systems, a first system 10 can, for example, manage certain network devices (e.g., nodes 18 and 20) while a second system can manage other network devices (nodes 22 and 24). In view of the above, reference in this application to a single system 10 that manages virtual network 12 is intended to include such multiple system configurations (and other suitable multiple system configurations).

As described above, the implementation of traffic trending engine 26 in FIGS. 1 and 2 includes a combination of hardware and software to determine historical data trends for application data traffic monitored over a virtualized routing infrastructure in virtual network 12. It is appreciated that the monitored application can be a network-hosted application provided under the Software-as-a-Service (SaaS) model or another suitable cloud computing platform (or other delivery platform).

Description herein relating to network or traffic monitoring is intended to refer to overseeing the operation of the computer network using some specialized network management software. Such network monitoring can, for example, be capable of detecting and reporting failures of devices or connections. Network monitoring can further be used to measure processing resource utilization of hosts within the network (e.g., server 16), network bandwidth utilization of the links and other aspects of network operations.

Traffic flow in virtual network 12 can be extensive over a period of time, especially if many applications are hosted in the network. Indeed, network demands made by one application hosted in virtual network 12 may significantly affect the performance of other applications hosted in the network. Moreover, network usage of network-hosted applications may not be consistent over a period of time. Traffic trending engine 26 is therefore designed in some implementations to determine historical data trends for application data traffic based on monitored network usage of the network-hosted application. In some implementations, traffic trending engine 26 is used to determine historical data trends based on network throughput over the virtualized routing infrastructure for application data traffic. In some implementations, traffic trending engine 26 is used to determine historical data trends based on network resiliency over the virtualized routing infrastructure for application data traffic. It is appreciated that traffic trending engine 26 can be designed to determine historical data trends for application data traffic based on other network aspects, such as: time, transit delay, priority, protection, residual error rate, etc. Traffic trending engine 26 can, for example, use such historical data trends to identify a probable surge in data usage by the monitored application. For example, in one implementation, traffic data can indicate that the monitored application exhibits a surge in data usage ten minutes past the hour (e.g., corresponding to an hourly syncing operation) and identify this trend as a historical data trend for this application. It is appreciated that the above example is relatively simple and used primarily for illustration and that more advanced historical data trending can be incorporated. For example, statistical analysis of traffic based on factors beyond time, such as routing path, priority, etc., can be used by traffic trending engine 26 to determine a historical data trend.

Traffic trending engine 26 can, for example, interface with the various nodes of virtual network 12 via a suitable Application Program Interface ("API"), or another suitable protocol. In some implementations, traffic trending engine 26 may interface with network nodes via an interface channel that connects a given node to system 10 to configure and manage the node and receive events from the node. For example, in some implementations, traffic trending engine 26 is to receive data via Simple Network Management Protocol (SNMP) for use in determining historical data trends for application data traffic. In such an implementation, SNMP traps can, for example, be used in order to enable an agent installed on a network node to notify traffic trending engine 26 of significant events by the way of an unsolicited SNMP message. Although a monitoring application can be installed on a network node, in some implementations, a monitoring application can be external to any single node, but interfaced with the node or to another component of virtual network 12 in order to receive monitoring data.

As described above, the implementation of topology determination engine 28 in FIGS. 1 and 2 includes a combination of hardware and software to determine an updated virtual network topology for the virtualized routing infrastructure based on the historical data trends determined by traffic trending engine 26. For example, in situations where congestion on the network is inconsistent, topology determination engine 28 can determine an updated topology that can adapt to the requirements of the application over a period of time. The updated topology can lead to efficient usage of the network resources.

In some implementations, topology determination engine 28 can determine the updated virtual network topology to adapt to the needs of the application in the network at a given time. For example, topology determination engine 28 can be operative to determine an updated network topology for the virtualized routing infrastructure to achieve a predetermined Quality of Service (QoS) for application data traffic over the network.

In some implementations, topology determination engine 28 can, for example, determine whether the topology should be "scaled up" or "scaled down." As used herein, the term "scaling" can refer, for example, to updating an infrastructure of a virtual network in order to better accommodate a predicted or current load from an application using the network. In some implementations, topology determination engine 28 can determine based on historical data trends that the infrastructure should be scaled up and adding a new virtual network resource to the network infrastructure and/or configuring the routing parameters to provide better a better QoS for the application. In some implementations, topology determination engine 28 can determine based on historical data trends that the infrastructure should be scaled down in the event of an expected decrease in network resources usage and/or consumption.

In some implementations, topology determination engine 28 is to determine an updated virtual network topology for the virtualized routing infrastructure based on the determined historical data trends by identifying that virtual routing paths should be added to the virtualized routing infrastructure to accommodate a predicted increase in traffic load over the virtualized routing infrastructure above a predetermined threshold. For example, topology determination engine 28 is to determine an updated virtual network topology that includes additional virtual routing paths by indicating that a virtual network switch should be added to the virtualized routing infrastructure. As another example, topology determination engine 28 is to determine an updated virtual network topology that includes additional virtual routing paths by indicating that an additional network connection should be added between previously connected network nodes.

It is appreciated that topology determination engine 28 can determine a topology based on the needs across an entire data path (e.g., a path defined by nodes 18, 20, and 22 link client 14 to server 16) or based on the needs of a single node (e.g., node 18) or subset of nodes. As but one example, in situations where the parameters of a single node along a datapath are determinative of an overall QoS for a datapath, topology determination engine 28 can take this information into account when updating the topology of virtual network 12.

As described above, topology determination engine 28 can update a topology of virtual network 12 by adding or removing virtual nodes, such as virtual switches. In some implementations, topology determination engine 28 can additionally or alternatively update or otherwise scale the topology of the virtual network by including additional virtual links between existing nodes. As but one example, topology determination engine 28 can implement Link Aggregation (LAG) between otherwise connected devices in order to increase throughput, provide redundancy, balance data traffic, and/or provide other properties to achieve desired performance. LAG can, for example, be implemented by allowing a node with LAG functionality (i.e., a "LAG node") itself to determine which link to route traffic to the adjacent downstream node. This determination can, for example, be based on packet metadata and port selection logic for forwarding the packet. In such an implementation, the port selection logic for forwarding a packet within a LAG may reside within the LAG node itself and can, for example, be in the form of a hash of a set of parameters for a given packet, such as Media Access Control (MAC) address, Internet Protocol (IP) address, Transmission Control Protocol (TCP) port, User Datagram Protocol (UDP) port, etc. It is appreciated that topology determination engine 28 can employ other strategies for updating the topology of virtual network 12 in order to account for historical data trends of a network-hosted software application.

As described above, the implementation of network scaling engine 30 in FIGS. 1 and 2 includes a combination of hardware and software to automatically scale the virtualized routing infrastructure to achieve the updated virtual network topology. With reference to the implementation of virtual network 12 and system 10 of the figures, FIG. 2 illustrates that in some situations, virtual routing paths are added to the virtualized routing infrastructure of virtual network 12 to accommodate a predicted increase in traffic load over the virtualized routing infrastructure above a predetermined threshold. For illustration, FIG. 2 depicts several ways in which additional virtual routing paths can be added to virtual network 12. For example, one way that virtual routing paths are created is by the addition of virtual node 32 (e.g., in the form of a virtual switch). As another example, a LAG connection 34 is created between node 24 and node 22. As another example, a new virtual routing path 35 is created between previously existing virtual nodes 18 and 22. As described above with respect to topology determination engine 28, it is appreciated that other forms of new routing paths (or other changes to the topology of virtual network 12) can be implemented in order to achieve appropriate topology scaling to accommodate predicted application usage.

It is appreciated that other engines can be added to system 10 for additional or alternative functionality. For example, in some implementations, system 10 can include a communication engine which is a combination of software and hardware to allow network communication with elements of virtual network 12. In some implementations, such a communication engine includes one or more physical data ports to connect to elements of virtual network 12. For example, in some implementations, the communication engine can include a network interface controller having an Ethernet port. In some implementations, the communication engine can include wired or wireless communication interface. The communication engine can, in some implementations, provide for virtual network ports. In some implementations, the communication engine includes hardware in the form of a hard drive, related firmware, and other software for allowing the hard drive to operatively communicate with other hardware of system 10. The communication engine can include machine-readable instructions for use with the communication engine, such as firmware for implementing physical or virtual network ports. As another example, in some implementations, system 10 can include an I/O engine that is a combination of hardware and software to allow an operator to view and/or interact with system 10. Example of suitable I/O engines can include engines for monitors, printers, keyboards, mouses, styluses, touchscreens, speakers, etc. I/O devices for such engines can be connected to elements of system 10 via wired or wireless links.

It is appreciated that certain engines described herein or otherwise can, in some implementations, share hardware, software, or data with other engines. As but one example, in some implementations, topology determination engine 28 and network scaling engine 30 can share a computer-readable medium and/or processing resource, whereas in some implementations, topology determination engine 28 and network scaling engine 30 use separate mediums and processing resources. It is appreciated that any engines of system 10 can share hardware, software, or data with any other engine of system 10 in order to achieve their respective objectives.

Figure 3:
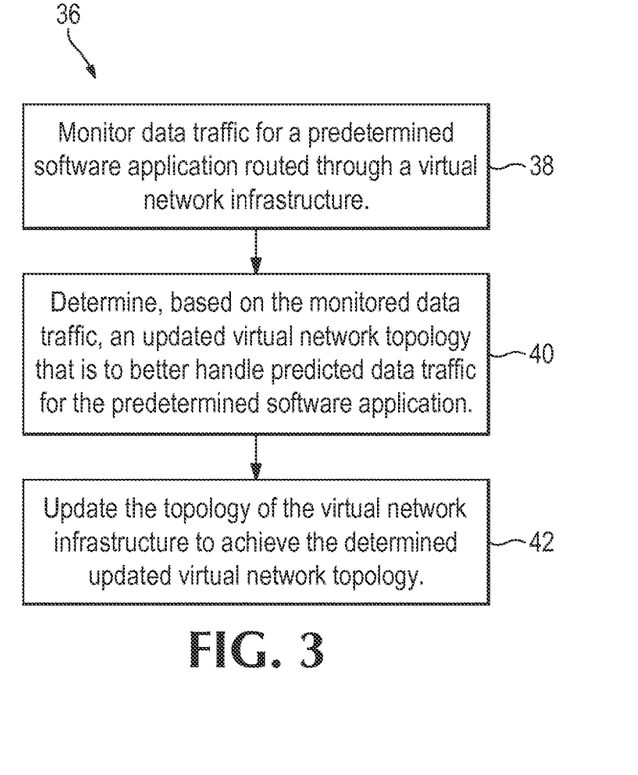
FIG. 3 is a flow diagram depicting steps taken to implement an example.

OPERATION: FIG. 3 is a flowchart for a method 36 of operating a system in accordance with the disclosure herein. The description of method 36 and its component steps make reference to elements of system 10 and other network elements for illustration, however, it is appreciated that this method can be used or otherwise applicable for any suitable system or units. Moreover, references to system 10 and elements thereof are not intended to suggest specific requirements or functionality of system 10. For example, method 36 can be applied to computer networks with different network topologies than that illustrated in FIGS. 1 and 2.

Method 36 includes a step 38 of monitoring data traffic for a predetermined software application routed through a virtual network infrastructure. In some implementations, step 38 is performed by a virtual network node (e.g., a virtual switch) within virtual network 12. In some implementations, step 38 is performed by a hardware network switch underlying virtual network 12. In some implementations, step 38 is performed by system 10 receiving raw data from one or more virtual nodes of virtual network 12 or hardware nodes of the underlying network. It is appreciated that the term "monitor" or "monitoring" can refer to the act of sensing traffic data as well as the acts of analyzing the data for trends or other patterns, as well as other related activities. As a result, system 10 can be said to monitor traffic data of virtual network 12 even if it receives monitored traffic data originally sensed from another device. As described above with respect to traffic trending engine 26, step 38 can include interfacing with one or more nodes of via a suitable Application Program Interface ("API"), or another suitable protocol, such as Simple Network Management Protocol (SNMP), for use in determining traffic data, such as network throughput, resiliency, transit delay, priority, protection, residual error rate, etc. It is appreciated that any suitable aspects of traffic trending engine 26 of system 10 described above with respect to FIGS. 1 and 2 can be applied to step 38 of method 36 and vice versa.

Method 36 includes a step 40 of determining, based on the monitored data traffic, an updated virtual network topology that is predicted to better handle data traffic for the predetermined software application. As described above with respect to topology determination engine 28, step 40 can take data monitored in step 38 and determine an updated virtual network topology that can adapt to the requirements of the monitored network-hosted application over a period of time. It is appreciated that any suitable aspects of topology determination engine 28 of system 10 described above with respect to FIGS. 1 and 2 can be applied to step 40 of method 36 and vice versa. As but one example, one or more aspects relating to the determination of historical data trends used by traffic trending engine 26 can be incorporated into step 40 of method 36.

Method 36 includes a step 42 of updating the topology of the virtual network infrastructure to achieve the determined updated virtual network topology. As described above with respect to network scaling engine 30, step 42 can include adding virtual routing paths to the virtualized routing infrastructure of virtual network 12 to accommodate a predicted increase in traffic load over the virtualized routing infrastructure above a predetermined threshold. For example, with reference to network scaling engine 30 described above, step 42 can add virtual routing paths by having system 10 create additional virtual nodes by: (1) adding virtual nodes between existing nodes, (2) creating LAG connections between nodes, (3) creating additional routing paths between existing nodes, and/or (4) other changes to the topology of virtual network 12 to achieve appropriate topology scaling to accommodate predicted application usage. It is appreciated that any suitable aspects of network scaling engine 30 of system 10 described above with respect to FIGS. 1 and 2 can be applied to step 42 of method 36 and vice versa.

It is appreciated that steps of method 36 can be rearranged, supplemented, or approximated using greater or fewer steps. As but one example, in some implementations, aspects relating to step 38 of monitoring data traffic can occur during step 40 of updating the virtual network's topology.

Figure 4:
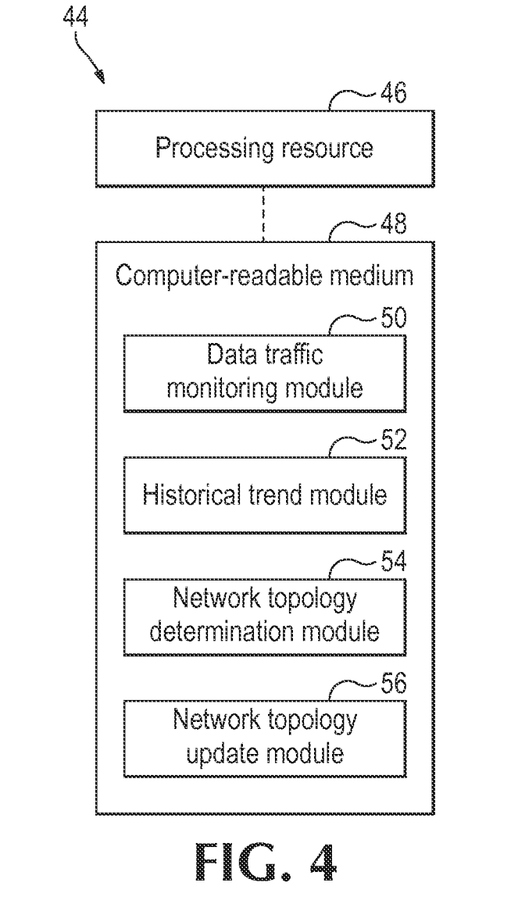
FIG. 4 is a block diagram depicting a processing resource and a computer-readable medium, according to an example.

FIG. 4 illustrates a system 44 according to another example. It is appreciated that one or more aspects of the system 10 and/or method 36 can be implemented in another system or method described herein (and vice-versa). For example, certain aspects of system 10 can be implemented in system 44. Likewise, certain aspects of system 44 can be implemented in system 10. For example, one or more aspects relating to a processing resource or a computer-readable medium described below with respect to system 44 can be incorporated in one or more engines of system 10.

System 44 can, for example, be used to provide network management functionality for a virtual network by executing one or more steps of method 36 or other methods described herein. For convenience, the description of computing system 44 refers to elements of virtual network 12. However, it is appreciated that system 44 can be used with any suitable network or system. System 44 includes a processing resource 46 and computer-readable storage medium 48 as described further below. It is appreciated that system 44 can include additional elements, such as input/output (I/O) devices, a communication interface, etc. In some implementations, software that provides the functionality of system 10 can be stored on computer-readable medium 48 of system 44 to be executed by processing resource 46 of system 44.

Computer-readable medium 48 is a non-transitory medium encoded with instructions executable by a processing resource 46. As illustrated in FIG. 4, the instructions include: (1) a data traffic monitoring module 50 that, when executed, causes processing resource 46 to monitor data traffic over virtual network 12 for a software application; (2) a historical trend module 52 that, when executed, causes processing resource 46 to determine historical trends in the monitored data traffic; (3) a network topology determination module 54 that, when executed, causes processing resource 46 to determine, based on the determined historical trends, an updated virtual network topology for virtual network 12 to improve network performance of the software application; and (4) a network topology update module 56 that, when executed, causes processing resource 46 to update the topology of virtual network 12 to achieve the determined updated virtual network topology.

Each set of instructions are described above with respect to their respective engines of system 10 and/or steps of method 36. For example, data traffic monitoring module 50 and historical trend module 52 can incorporate one or more aspects of traffic trending engine 26 of system 10 as well as step 38 of method 36 (and vice versa). Likewise, network topology determination module 54 can, for example, incorporate one or more aspects of topology determination engine 28 of system 10 as well as step 40 of method 36 (and vice versa). Moreover, network topology update module 56 can, for example, incorporate one or more aspects of network scaling engine 30 of system 10 as well as step 42 of method 36 (and vice versa).

Suitable computer processing resources for use with system 44 can, for example, be in the form of a central processing unit (CPU), a semiconductor-based microprocessing resource, a digital signal processing resource (DSP) such as a digital image processing unit, other hardware devices or processing elements suitable to retrieve and execute instructions stored in a computer-readable medium, or suitable combinations thereof. Suitable processing resources can, for example, include single or multiple cores on a chip, multiple cores across multiple chips, multiple cores across multiple devices, or suitable combinations thereof. Suitable processing resources can be functional to fetch, decode, and execute instructions as described herein. As an alternative or in addition to retrieving and executing instructions, suitable processing resources can, for example, include at least one integrated circuit (IC), other control logic, other electronic circuits, or suitable combination thereof that include a number of electronic components for performing the functionality of instructions stored on a computer-readable medium. Suitable processing resources can, for example, be implemented across multiple processing units and instructions may be implemented by different processing units in different areas of computing system.

Embodiments can be realized in any computer-readable medium for use by or in connection with an instruction execution system such as a computer/processor based system or an ASIC (Application Specific Integrated Circuit) or other system that can fetch or obtain the logic from computer-readable medium and execute the instructions contained therein. Suitable machine-readable storage mediums can, for example, be in the form of non-transitory storage mediums. The term "non-transitory" as used herein can, for example, refer to mediums that do not encompass a transitory signal but instead is made up of one or more memory resource components configured to store relevant machine-readable instructions. Such mediums can, for example, be in the form of electronic, magnetic, optical, or other physical storage mediums to store information, such as computer instructions. Suitable computer instructions can, for example, be machine-readable instructions executable by a processing resource of system 44 and can be operative to perform one or more functions described herein, such as those described above with respect to method 36 of FIG. 3.

Storage mediums can, for example, be housed within the same housing as processing resources, such as for example within a common tower case, laptop housing, rack system, etc. In some implementations, the mediums and processing resources can be housed in different housings. As used herein, the term "machine-readable storage medium" can, for example, include Random Access Memory resource (RAM), flash memory resource, a storage drive (e.g., a hard disk), any type of storage disc e.g., a Compact Disc Read Only Memory resource (CD-ROM), any other type of compact disc, a DVD, etc.), and the like, or a combination thereof. In some implementations, mediums can correspond to a memory resource including a main memory resource, such as a Random Access Memory resource (RAM), where software may reside during runtime, and a secondary memory resource. The secondary memory resource can, for example, include a nonvolatile memory resource where a copy of machine-readable instructions are stored. It is appreciated that instructions and data can be stored on separate machine-readable storage mediums. For purposes of clarity, multiple storage mediums can be identified as a single medium and multiple processing resources can be identified as a single processing resource.

In one example, program instructions can be part of an installation package that when installed can be executed by processor resource 46 to implement system 44. In this case, medium 48 may be a portable medium such as a CD, DVD, or flash drive or a memory maintained by a server from which the installation package can be downloaded and installed. In another example, the program instructions may be part of an application or applications already installed. Here, medium 48 can include integrated memory such as a hard drive, solid state drive, or the like.

CONCLUSION: While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific engines or elements can be included at different engines or elements in other implementations.

As used herein, the term "provide" includes push mechanisms (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes.

Furthermore, it should be understood that the systems, networks, and methods described herein can include various combinations and/or sub-combinations of the components and/or features of the different implementations described. Thus, features described with reference to one or more implementations can be combined with other implementations described herein.

What is claimed is:

1. A system comprising:
a processing resource; and
a memory resource storing non-transitory machine-readable instructions to cause the processing resource to:
determine historical data trends for application data traffic monitored over a virtualized routing infrastructure having a plurality of nodes in a network;
determine an updated virtual network topology for the virtualized routing infrastructure based on the determined historical data trends by identifying that virtual routing paths should be added to the virtualized routing infrastructure to accommodate a predicted increase in traffic load over the virtualized routing infrastructure above a predetermined threshold; and
automatically scale the virtualized routing infrastructure to achieve the determined updated virtual network topology by implementing Link Aggregation (LAG) via a node of the plurality of nodes such that the LAG node determines a link to route a packet downstream on the network, wherein the determination is based on packet metadata of the packet.

2. The system of claim 1, including instructions to cause the processing resource to determine an updated virtual network topology that includes additional virtual routing paths by indicating that a virtual network switch should be added to the virtualized routing infrastructure.

3. The system of claim 1, including instructions to cause the processing resource to determine an updated virtual network topology that includes additional virtual routing paths by indicating that an additional network connection should be added between previously connected network nodes.

4. The system of claim 1, including instructions to cause the processing resource to determine that virtual routing paths should be removed from the virtualized routing infrastructure to accommodate a predicted decrease in traffic load over the virtualized routing infrastructure above a predetermined threshold.

5. The system of claim 1, including instructions to cause the processing resource to determine historical data trends based on network throughput over the virtualized routing infrastructure for application data traffic.

6. The system of claim 1, including instructions to cause the processing resource to determine historical data trends based on network resiliency over the virtualized routing infrastructure for application data traffic.

7. The system of claim 1, including instructions to cause the processing resource to determine an updated network topology for the virtualized routing infrastructure to achieve a predetermined Quality of Service (QoS) for application data traffic over the network.

8. The system of claim 1, including instructions to cause the processing resource to receive data from a monitoring application installed on a network device within the virtualized routing infrastructure to determine historical data trends for application data traffic.

9. The system of claim 1, including instructions to cause the processing resource to receive data via Simple Network Management Protocol (SNMP) to determine historical data trends for application data traffic.

10. The system of claim 1, wherein the network is a cloud network and the virtualized routing infrastructure and the application are hosted in the cloud network.

11. A method comprising:
monitoring application data traffic for a predetermined software application routed through a virtual network infrastructure having a plurality of nodes in a network;
determining historical data trends for the monitored application data traffic;
determining, based on the historical data trends, an updated virtual network topology that is to better handle predicted data traffic for the predetermined software application by identifying that virtual routing paths should be added to the virtual network infrastructure to accommodate a predicted increase in traffic load over the virtual network infrastructure above a predetermined threshold; and
automatically scaling the virtual network infrastructure to achieve the determined updated virtual network topology by implementing Link Aggregation (LAG) via a node of the plurality of nodes such that the LAG node determines a link to route a packet downstream on the network, wherein the determination is based on packet metadata of the packet.

12. The method of claim 11, wherein the data traffic monitoring is performed by a virtual network switch within the network.

13. The method of claim 11, wherein the data traffic monitoring is performed by a hardware network switch within the network.

14. A memory resource storing non-transitory machine-readable instructions that when executed causes a processing resource to implement a virtual network topology updating system, the instructions comprising:
a data traffic monitoring module that, when executed, causes the processing resource to monitor data traffic over a virtual network having a plurality of nodes for a software application;
a historical trend module that, when executed, causes the processing resource to determine historical trends in the monitored data traffic;
a network topology determination module that, when executed, causes the processing resource to determine, based on the determined historical trends, an updated virtual network topology for the virtual network by identifying that virtual routing paths should be added to the virtual network to accommodate a predicted increase in traffic load over the virtual network above a predetermined threshold to improve network performance of the software application; and
a network topology update module that, when executed, causes the processing resource to automatically scale the topology of the virtual network to achieve the determined updated virtual network topology by implementing Link Aggregation (LAG) via a node of the plurality of nodes such that the LAG node determines a link to a packet downstream on the virtual network, wherein the determination is based on packet metadata of the packet.

* * * * *